Oct. 15, 1963   C. B. COLEMAN   3,107,302
TWO COLOR BACKGROUND ELIMINATION DETECTOR
Filed Sept. 25, 1959   2 Sheets-Sheet 1
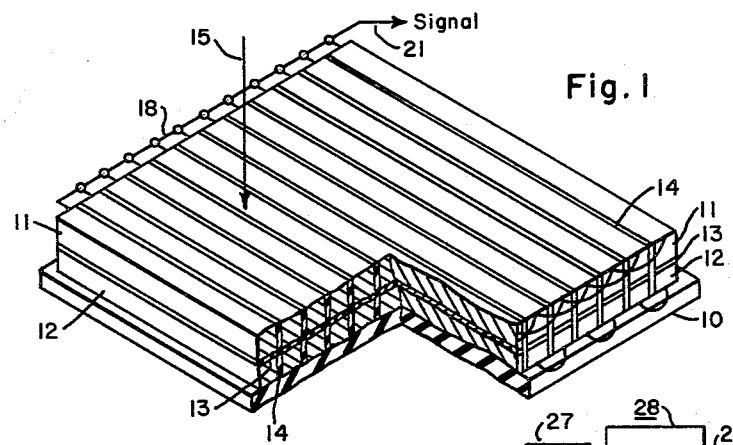
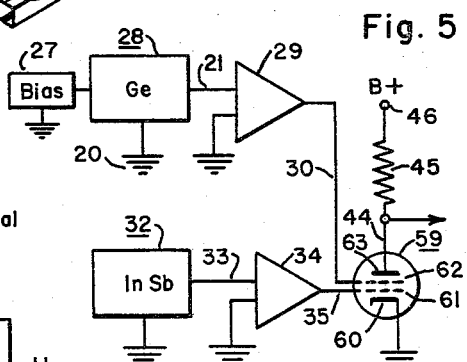
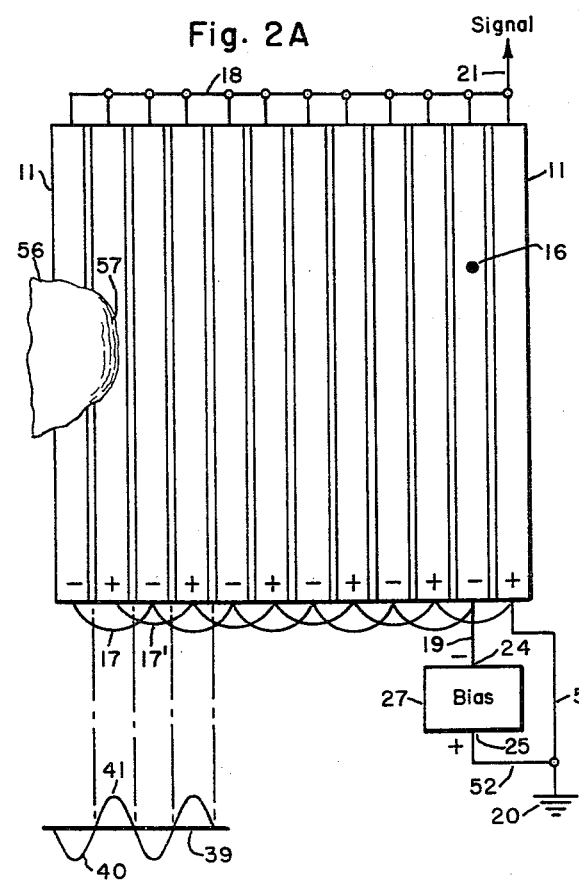
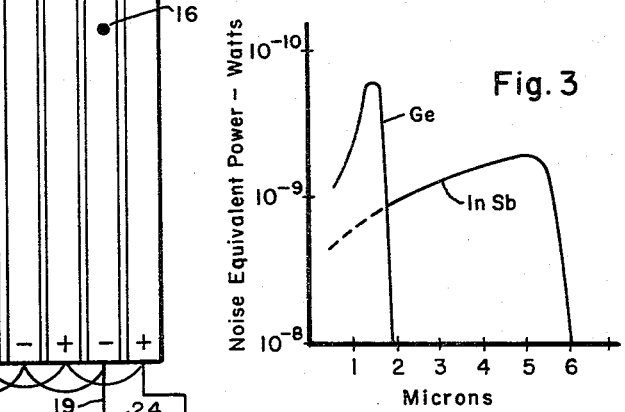
INVENTOR
Clarence B. Coleman
BY *Maury I. Hull*
ATTORNEY Oct. 15, 1963  C. B. COLEMAN  3,107,302
TWO COLOR BACKGROUND ELIMINATION DETECTOR
Filed Sept. 25, 1959  2 Sheets-Sheet 2
Fig. 4
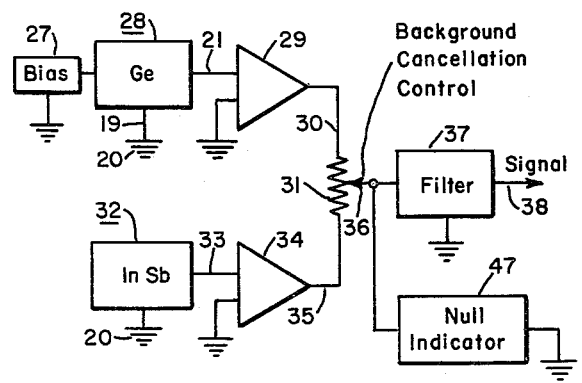
Fig. 6A
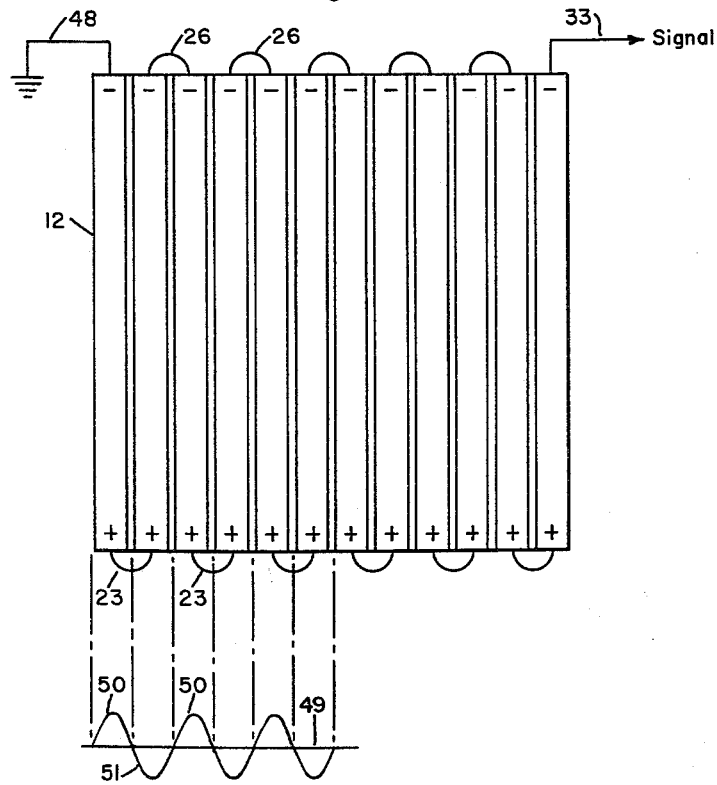
Fig. 6B

United States Patent Office 3,107,302
Patented Oct. 15, 1963

3,107,302
TWO COLOR BACKGROUND ELIMINATION
DETECTOR
Clarence B. Coleman, Baltimore, Md., assignor to Westinghouse Electric Corporation, East Pittsburgh, Pa., a corporation of Pennsylvania
Filed Sept. 25, 1959, Ser. No. 842,232
15 Claims. (Cl. 250—211)

This invention relates to improvements in radiant energy detectors and more particularly to an improved two color background elimination detector especially suitable for detection of infrared radiation.

The most serious problem in air-to-air and ground-to-air infrared detection is background interference. Infrared radiation from aircraft targets lies in the 2 to 10 micron wavelength region. The wavelength of maximum radiation depends upon whether hot tailpipes, hot exhaust gas or aerodynamically heated surfaces are the main source of the radiation. Radiation from the sun extends from .5 micron through the wavelength of the target. It is this sun radiation and its reflection from clouds and objects on the ground that causes the interference to infrared detection systems.

Prior art devices for improving target to background contrast may be divided into three classes depending upon the method employed. These methods are spectral filtering, size discrimination, and background cancellation. Since the sun interference covers the same spectrum as the target, spectral filtering is severly limited in its usefulness. Size discrimination is also limited since a small cloud can subtend the same angle as a target (measured from the infrared detector) even though the distance to the cloud may not be the same as that to the target aircraft.

The apparatus of the instant invention uses the method of background cancellation to obtain improved target to background contrast. In summary, the apparatus of the instant invention uses two detectors of different materials, one directly in front of the other and both constructed of strips of equal width. The material of the front detector, that is the first to receive energy, has the characteristic that it absorbs energy only at short wavelengths and is transparent at longer wavelengths. The back detector, therefore, receives only long wavelength energy. The electrical outputs of the front and back detectors are connected in phase opposition through balancing means to a cancellation or gating device. Both detectors being sensitive to radiation from the sun, the portion of the output of the circuit resulting from sun radiation may be adjusted to zero by the balancing or cancellation device. However, only the back detector is sensitive also to radiant energy of the wavelengths of the target source so that cancellation of outputs resulting from target radiation does not occur. Energy originating at a target source passes through the front detector to the back detector providing a signal which is not cancelled in the cancellation means and thereby provides a useful signal output.

Accordingly, a primary object of the invention is to provide a new and improved radiant energy detector.

Another object is to provide a new and improved two color background elimination detector.

A further object is to provide new and improved detector apparatus for providing increased target to background contrast.

These and other objects and advantages will become more clearly apparent after a study of the following specification when read in connection with the accompanying drawings, in which:

FIG. 1 is a perspective view of the detector element assembly according to the instant invention;

FIG. 2A is a plan view of the upper detector assembly employing photoconductive detector material and showing the electrical connections thereto;

FIG. 2B is a graph illustrating the signal output from the apparatus of FIG. 2A under certain assumed conditions of operation;

FIG. 3 is a graph showing on the same coordinate scales the characteristics of the two detector materials employed in the detector assembly of FIG. 1;

FIG. 4 is an electrical circuit diagram for obtaining the useful output signal of the apparatus;

FIG. 5 shows a second embodiment of the invention employing a multigrid gating tube;

FIG. 6A shows the electrical connections to the lower detector assembly employing photovoltaic material; and FIG. 6B is a graph illustrating the operation of the apparatus of FIG. 6A.

Reference is made now to the drawings for a more detailed understanding of the invention, and in particular to FIG. 1 thereof. Mounted upon a supporting or substrate means 10 of any suitable material are two rows of detector elements which are of substantially the same size. The detector elements 11 of the upper row are composed of a suitable material such for example as germanium, while the detector elements 12 of the lower row are composed of a suitable material such for example as indium antimonide. The upper and lower rows of detector elements are separated and insulated electrically from each other by a suitable material chosen to transmit energy of the desired wavelength. A suitable material for use at 13 for insulating the upper and lower strips of elements from each other is sapphire or quartz, depending upon the wavelength to be employed in the apparatus. There are shown at 14 thin strips of insulating material disposed between the adjacent elements of each layer. These sheets 14 are preferably as thin as possible and may be composed of a suitable electrical insulating material such for example as mica.

Radiant energy arrives at the detector assembly of FIG. 1 from the direction indicated by the arrow 15. It will be understood that the upper surface of detector elements 11 is located at or near the focal plane of an optical system, not shown. Any suitable optical system may be employed for focusing onto the detector elements 11 images of the target or other sources of radiant energy, such for example as the image 16 of FIG. 2A. The strips or sections 11 of the detector are equal to or wider than the diameter of the optical blur circle 16 which represents the minimum focused image area of an object at infinity. It will be further understood that any convenient mounting means may be provided for moving the optical system, not shown, and the detector assembly of FIG. 1 together to scan lines or strips across the sky in a manner whereby all objects in the field of view will "see" the detector strips in succession. Preferably the scanning rate is uniform.

Particular reference should be made now to FIGURE 2A. The strips 11 of the detector material of the upper layer are interconnected, the lower ends as seen in FIGURE 2A being connected by leads 17 and 17' and the upper ends being connected together by leads 18. The lower end of the next to last strip (left to right) as viewed in FIGURE 2A is also seen to be connected by lead 19 to one terminal 24 of a suitable source of direct current biasing potential 27 having the other terminal 25 thereof connected to ground 20 by lead 52. The lower end of the last detector strip is also seen to be connected to ground 20 by lead 52. It will be understood that radiation energy impinging upon a photoconductive detector such as germanium produces a decrease in the resistance of the strip and that signal polarity depends upon the polarity of the biasing potential.

A cloud generally designated 56 is shown, part of the cloud being in the field of view of the detector apparatus, the cloud having an edge 57 of non-uniform brightness due to reflection of the sun's rays.

Particular reference should be made now to FIGURE 6A. The strips 12 of the detector material of the lower layer are interconnected, the lower ends as seen in FIGURE 6A being connected by leads 23 and the upper ends being connected together by leads 26. The upper end of the first strip as viewed in FIGURE 6A is seen to be connected by lead 48 to ground 20. It will be understood that radiant energy impinging upon a photovoltaic material such as indium antimonide generates a voltage which has a polarity depending upon the direction of movement of the carriers in the semiconductor elements.

Particular reference should be made now to FIG. 3 in which there are shown graphs showing the characteristics of the germanium elements 11, and the indium antimonide elements 12, the characteristic shown being the noise equivalent power in watts as a function of the wavelength of the radiant energy in microns. As will be understood by those skilled in the art, the term "noise equivalent power" is used to define or describe the amount of power which must be put into the element to get a signal out equal to the inherent noise level, or to provide a signal to noise ratio of 1:1. It will be seen that the response of the germanium element covers the micron range of 0.5 to 2 microns which, as previously explained, is within the spectrum of radiant energy from the sun and covers a portion of the band of wavelengths to which the indium antimonide is responsive, the indium antimonide being responsive to radiant energy in the range or band from 0.5 to substantially 6 microns, but as illustrated in the graph of FIG. 3, energy having a wavelength below the upper wavelength limit of the response of the germanium does not affect the indium antimonide because this energy is absorbed by the germanium and utilized in the generation of the signal therein, so that only radiant energy in the range of approximately 2 microns to approximately 6 microns in wavelength reaches elements 12, this last named range being the range of the wavelengths emanating from jet and rocket propelled air and space vehicles, as previously explained.

Particular reference should be made now to FIG. 4. The element shown in block form and generally designated 28, it will be understood, includes all of the elements 11 of FIG. 1 or 2A, and the output from the upper layer of detector elements is taken on lead 21 and applied, for example, by way of a coupling capacitor, not shown, to an amplifier 29 which may be of conventional design, the output of the amplifier 29 being developed on lead 30 and applied to one end of a balancing potentiometer 31. The potentiometer 31 provides a background cancellation control as will become more clearly apparent. The entire group of indium antimonide detector elements 12 is comprised within the element shown in block form at 32 in FIG. 4, and one terminal of the detector element group 32 is connected to ground 20 whereas the other terminal is connected by lead 33 and suitable coupling means, for example, a coupling capacitor, not shown, to an amplifier 34 which is preferably similar to amplifier 29, the output of the amplifier 34 being connected by lead 35 to the other terminal of the aforementioned potentiometer 31. The arm 36 of the potentiometer is connected to a filter of any convenient design shown in block form and designated 37, and the output of the filter 37 is developed on lead 38. Filter 37 preferably has a narrow band-pass at a fundamental frequency determined by the scanning rate. A null detector 47 connected to arm 36 is provided for indicating when signal components resulting from background radiation reach or approach complete cancellation.

Particular reference is made now to FIG. 2B in which the signal on lead 30 (and also on lead 21) in phase relation to the sensitive strips of the layer of detector elements 11 is shown for simple assumed conditions of operation, that is, when the field of view includes one cloud edge 57 in an otherwise clear sky. In the following description the target image 16 is assumed not to be present. As the cloud edge 57 moves across the detector elements 11, the polarity of the output is seen to vary periodically above and below a reference level 39 established by the bias potential from source 27, alternative detector elements 11 providing negative alternations 40 and other alternative detector elements providing positive alternations 41. The wave form of FIG. 2B may be flat-topped or approximately sinusoidal depending upon the diameter of the cloud edge, in relation to the width of the detector elements and the width of the insulation strips 14. Filter 37 may have some effect on the waveform on lead 38.

Particular reference is made now to FIGURE 6B in which the signal on lead 35 (and on lead 33) in phase relation to the sensitive strips of the layer of detector elements 12 is shown for the same assumed conditions of operation stated above. As the cloud edge 57 moves across the detector elements 12, the polarity of the output is seen to vary above and below a reference level 49 established by the substantially constant energy source from the sun, alternative detector elements 12 providing positive alternations 50 and other alternative detector elements providing negative alternations 51. The waveform of FIGURE 6B is seen to be identical in shape but opposite in phase to that of FIGURE 2B.

In the operation of the apparatus it will be recalled that the energy of the sun covers the entire wavelength spectrum from 0.5 micron to 6 microns, or in other words radiant energy from the sun is absorbed by both the germanium elements 11 and the indium antimonide elements 12. Accordingly, by adjusting the position of the potentiometer arm 36 the signals or signal components resulting from background radiation from the sun can be cancelled out at the potentiometer 31, it being previously noted that the outputs of the two layers of detector elements are utilized in phase or polarity opposition.

Assume now for purposes of explanation that a target image 16 appears. After the background radiation from the sun has been cancelled out by adjustment of arm 36, an image of a target 16 moving across the detector elements, and having energy which falls somewhere within the range from 2 to 6 microns, is not absorbed by the germanium, providing no substantial output from the germanium, but the energy passes through the germanium and is utilized by the indium antimonide in providing a signal, which alternates in polarity as the radiant energy transmitted through the upper layer of elements moves from element to element of the lower layer, and this useful signal is not cancelled out at potentiometer 31 and after filtering at 37 provides the useful output on the aforementioned output lead 38.

Direct current components on leads 21 and 33 are eliminated by the aforementioned coupling capacitors.

While a number of objects including clouds or reflections appear simultaneously in the field of view, the output waveforms from the two groups 28 and 32 may be quite complex, but substantial cancellation of all signal components except that resulting from the target source may be obtained.

Particular reference should be made now to FIG. 5 in which a second circuit arrangement is shown. The group of germanium elements generally designated 28 supplies its output by the aforementioned lead 21 to the aforementioned amplifier 29 which develops its output on the aforementioned lead 30. The aforementioned group of indium antimonide elements 32 develops its output on lead 33 which is applied to the aforementioned amplifier 34 which develops its output on the aforementioned lead 35. An electron discharge tube generally designated 59 is provided having a cathode 60 connected to ground 20, having grids 61 and 62 and an anode 63 connected by lead 44 and resistor 45 to the positive terminal 46 of a suitable source of anode potential, not shown, having the other negative terminal thereof connected to ground 20. Lead 30 is connected to grid 62 whereas lead 35 is connected to grid 61. The inputs to the two grids 61 and 62 of tube 59 are in phase opposition as aforementioned and thus there is provided an arrangement for gating the signal of one detector by the signal from the other. The circuit of FIG. 5 eliminates the need for precise adjustment for automatic control since these features may not be required for all applications of the invention.

Means, not shown, may be provided for adjusting the gain of one of the amplifiers 29 and 34 in FIG. 5.

Whereas the invention has been shown and described with reference to the use of photoconductive germanium for the detector elements 11 and the use of photovoltaic indium antimonide for the detector elements 12, it should be understood that the invention is not limited to the use of these materials. The front detector elements 11 may be composed of gold doped germanium preferably less than 1 millimeter in thickness. Almost any long-wavelength detector such as the aforedescribed indium antimonide, lead selenide or lead telluride can be used for the back detector elements 12. If these latter mentioned photoconductive detectors are used the strip interconnection for the lower layer will be identical to that of the upper layer except that the polarity of the biasing supply is reversed so as to provide the correct signal phase for cancellation.

The invention includes the use of an automatic nulling control circuit, not shown, for automatically adjusting the position of the potentiometer arm 36 of FIG. 4. The details of such an automatic nulling control circuit will be readily apparent to one skilled in the art and need not be described in detail except to state that the servo should preferably have a response sufficiently fast to respond to variations in background but not fast enough to affect the much higher signal frequency, which may be of the order of 1000 or more c.p.s., depending upon the rate at which the detector assembly is scanned. A suitable circuit is shown and described in a work entitled "Servomechanism Analysis" by Thaler and Brown, McGraw-Hill Book Co., Inc., 1953, pages 363–367.

There has been provided then a background cancellation circuit having the advantages of simplicity and efficiency. Furthermore, the disclosed system and apparatus may be used with an optical system having a minimum of complexity and a minimum number of optical elements. Still further, the described apparatus is characterized by no substantial loss of the wanted wavelength energy except for the transmission loss of the germanium, which may be substantially negligible, since conventional systems frequently employ germanium filters to reduce sun energy, and the use of germanium filters does not substantially limit the effectiveness of the apparatus.

Preferably the groups of elements 28 and 32 contain even numbers of elements 11 and 12 respectively, although odd numbers can be successfully employed. Where even numbers are employed, some background cancellation may result from the fact that a number of the series-connected elements generate individual signals of one polarity as a result of constant background radiation while an equal number of the series-connected elements generate individual signals of the opposite polarity as a result of constant background radiation.

If desired, at least one of the filter 37 or the null detector 47 may have a resistive input.

Whereas the invention has been shown and described with respect to two embodiments thereof which give satisfactory results, it should be understood that changes may be made and equivalents substituted without departing from the spirit and scope of the invention.

I claim as my invention:

1. Two color background elimination detector apparatus comprising, in combination, first detector means, second detector means disposed adjacent the first detector means and electrically insulated therefrom, radiant energy from the sun and a target source arriving at the second detector means only after passing through the first detector means, said second detector means generating a signal in response to energy lying in a predetermined band of the spectrum of energy emitted by the sun, energy emitted by the target source also lying in said band, the first detector means absorbing radiant energy over a portion of said band and generating a signal while energy in said portion is absorbed thereby, the radiant energy from the target source lying outside of said portion, said first detector means passing to the second detector means radiant energy in the remainder of said band outside of said portion which arrives at the first detector means, said second detector means being responsive to the passed radiant energy and generating a signal while energy in said remainder impinges thereon, signal cancellation means, and means for applying the signals developed by the first detector means and the second detector means in phase opposition to the signal cancellation means, the signal cancellation means being adjustable in a manner whereby signal components of the first and second detector means provided by radiation from the sun are balanced out in the signal cancellation means and only a signal component resulting from radiant energy from the target source striking the second detector means provides a signal output.

2. Two color background elimination radiant energy detector apparatus comprising, in combination, a first layer of a predetermined number of detector elements, all the elements of the first layer having similar characteristics and being electrically connected together, a second layer of the same number of detector elements disposed adjacent the first layer of detector elements and insulated therefrom, all of the detector elements of the second layer having characteristics similar to each other and being electrically connected together, radiant energy reaching the elements of the second layer only after passing through adjacent elements of the first layer, the detector elements of the second layer being responsive to radiant energy lying in a predetermined band of the radiant energy spectrum of the sun, said band including the wavelengths of energy from a target source, the elements of the first layer absorbing radiant energy in a predetermined portion of said band and generating a signal while energy in said portion is absorbed thereby, the radiant energy from the target source lying outside of said portion, signal cancellation means having the signal from the first layer of detector elements applied thereto and the signal from the second layer of detector elements applied thereto in phase opposition, and output means, said cancellation means being adjustable whereby the signal from the first layer and the component of the signal from the second layer resulting from radiation received from the sun are cancelled out and only the component of the signal from the second layer resulting from radiant energy received from the target source is utilized to provide an output signal at the output means.

3. Two color background elimination detector apparatus comprising, in combination, first and second detector means being disposed adjacent each other and in such position that radiation reaching said second detector means must pass through said first detector means, said first detector means being substantially transparent to frequencies which overlap in the spectrum of background and target source frequencies to be detected, said first detector means having a spectral response different from that of the spectral response of said second detector means, and means connected to the first detector means and to the second detector means for cancelling out the signal from the first detector means and the component of the signal from the second detector means resulting from background radiation whereby a signal resulting from only radiation received from the target is obtained.

4. Two color background elimination detector apparatus comprising, in combination, first detector means responsive only to background radiation, said first detector means comprising a first plurality of detector elements mounted in predetermined positions with respect to each other, second detector means responsive to background radiation and to radiation from a target source to be detected, said second detector means comprising a second plurality of detector element mounted in predetermined positions with respect to each other and to the first plurality of detector elemens whereby radiant energy reaches an element of the second plurality only after passing through a corresponding element of the first plurality of detector elements, first circuit means interconnecting the first plurality of elements, second circuit means interconnecting the second plurality of detector elements, and adjustable signal cancellation means operatively connected to the first circuit means and to the second circuit means and having the signal from the first detector means and the signal from the second detector means applied thereto in phase opposition, said cancellation means being adjusted to a position whereat the signal components resulting from the background radiation are cancelled out and only a signal component resulting from the energy received from the target source is utilized to provide an output signal.

5. Apparatus according to claim 4 wherein the signal cancellation means is additionally characterized as including a potentiometer having an adjustable arm and having the signals from the first and second detector means applied to the terminals of the potentiometer.

6. Two color background elimination detector apparatus comprising, in combination, first detector means including a first plurality of similar photoconductive detector elements mounted in predetermined positions with respect to each other, means for applying a biasing potential to the first plurality of detector elements, second detector means including a second plurality of similar photovoltaic detector elements mounted in predetermined positions with respect to each other and with respect to the first pluraliy of detector elements whereby radiant energy reaches a detector element of the second plurality only after passing through a corresponding element of the first plurality of detector elements, first circuit means interconnecting all of the first plurality of detector elements, second circuit means connecting all of the second plurality of detector elements in series, said first plurality of detector elements being responsive only to radiant energy arriving from the background, said second plurality of detector elements being responsive to radiant energy arriving from the background and radiant energy arriving from the target source to be detected, electron discharge tube means having first and second grids, means connecting the first grid to the first detector means, means connecting the second grid to the second detector means, and output circuit means connected to said electron discharge tube means.

7. Apparatus according to claim 1 including in addition means connected to the signal cancellation means for indicating when the cancellation means is adjusted to a condition whereat maximum cancellation of the signal components resulting from radiation from the sun is obtained.

8. Apparatus according to claim 2 including in addition filter means interposed between the signal cancellation means and the output means.

9. In two color background elimination radiant energy detector apparatus, in combination, first detector means including a predetermined number of similar detector elements disposed adjacent to each other, second detector means including the same number of detector elements disposed adjacent to each other and adjacent to and electrically insulated from the corresponding detector elements of the first detector means, radiant energy reaching the elements of the second detector means only after passing through the adjacent elements of the first detector means, means movably mounting the first and second detector means for movement together, the detector elements of the second detector means being responsive to radiant energy lying in a predetermined band of the radiant energy spectrum of the sun, said band including the wavelengths of energy from the target source, the detector elements of the first detector means absorbing radiant energy in a predetermined portion of said band and generating a signal while energy in said portion is absorbed thereby, the radiant energy from the target source lying outside of said portion, adjacent elements of the first detector means producing signals of opposite polarity, adjacent elements of the second detector means producing signals of opposite polarity, each element in the first detector means producing a signal of opposite polarity to that of the signal produced by the adjacent element of the second detector means, and means having the signal output of the first detector means and the signal output of the second detector means applied thereto in phase opposition.

10. Apparatus according to claim 1 wherein the first detector means is composed of germanium and the second detector means is composed of indium antimonide.

11. Apparatus according to claim 9 wherein the detector elements of the first detector means are composed of germanium and the detector elements of the second detector means are composed of indium antimonide.

12. Apparatus according to claim 9 wherein the means having the outputs of the first and second detector means applied thereto in phase opposition is additionally characterized as being an electron tube having first and second control grids.

13. Detection apparatus for detecting radiant energy from a source in the general region of the infrared spectrum comprising first detector means including a plurality of detector elements mounted in predetermined positions with respect to each other, a second series of detector elements mounted in predetermined positions with respect to each other and with respect to said first series of detector elements whereby incident radiation reaching said second series of detector elements must pass through said first elements, said first and second series of detector elements having similar response to certain regions of the infrared spectrum and different response to another portion of the infrared spectrum and means operatively connected to said first and second detector elements for deriving an output signal which is a function of the difference between signals from said first and second series of detector elements.

14. Detector means for detecting a source of infrared radiation which falls within a range of the infrared spectrum which contains radiation from sources not desired to be detected, comprising a first series of detector elements disposed in a predetermined relation with respect to each other, a second series of detector elements mounted in a predetermined position with respect to each other and with respect to said first series of detector elements, whereby incident radiation reaching said second series of detector elements must pass through said first series of detector elements, said first detector elements generating signals in response to sources not desired to be detected, said second series of detector elements generating signals in response to both the sources desired to be detected and to sources not desired to be detected, said first and second series of detector elements having substantially the same response to certain regions of the infrared spectrum in which both signals from sources undesired to be detected and from sources desired to be detected are present, said first and second series of detector elements having different response to another portion of the spectrum in which occur signals desired to be detected, and means operatively connected to said first and second series of detector elements for deriving an output signal which is a function of the difference in response of said first and second series of detector elements.

15. Two color background elimination detector apparatus comprising, in combination, first detector means generating a signal in response to background radiation only, second detector means disposed in predetermined position with respect to the first detector means and generating a signal in response to both background radiation and radiation from the target source, radiation reaching the second detector means only after passing through the first detector means, and means operatively connected to the first detector means and to the second detector means for cancelling out signals and signal components resulting from background radiation, an electron discharge device having first and second control elements, the signal from one of said detector means being applied to one of said control elements, the signal from the other of said detector means being applied to the other of said control elements in phase opposition to the signal applied to the first control element, and circuit means connected to said electron discharge device for obtaining a signal output therefrom, whereby a signal resulting from only radiation received from the target source is obtained.

References Cited in the file of this patent

UNITED STATES PATENTS

| | | |
|---|---|---|
| 2,423,885 | Hammond | July 15, 1947 |
| 2,740,961 | Slater | Apr. 3, 1956 |
| 2,742,550 | Jenness | Apr. 17, 1956 |
| 2,794,926 | Watts et al. | June 4, 1957 |
| 2,927,212 | Shimukonis | Mar. 1, 1960 |
| 2,961,542 | Cartwright et al. | Nov. 22, 1960 |
| 3,015,034 | Hanlet | Dec. 26, 1961 |
| 3,020,406 | Whitney | Feb. 6, 1962 |
| 3,031,576 | Loy | Apr. 24, 1962 |